June 26, 1923.

M. LOUGHEAD

HYDRAULIC BRAKE

Filed Jan. 23, 1922

1,460,164

Inventor
Malcolm Loughead
Williams, Bradbury,
McCaleb & Pierce attys.

Patented June 26, 1923.

1,460,164

UNITED STATES PATENT OFFICE.

MALCOLM LOUGHEAD, OF DETROIT, MICHIGAN, ASSIGNOR TO FOUR WHEEL HYDRAULIC BRAKE COMPANY, OF LOS ANGELES, CALIFORNIA, A CORPORATION OF CALIFORNIA.

HYDRAULIC BRAKE.

Application filed January 23, 1922. Serial No. 531,142.

*To all whom it may concern:*

Be it known that I, MALCOLM LOUGHEAD, a citizen of the United States, and resident of Detroit, in the county of Wayne and State of Michigan, have invented a certain new and useful Improvement in Hydraulic Brakes, of which the following is a full, clear, concise, and exact description, reference being had to the accompanying drawings, forming a part of this specification.

My invention relates to hydraulic brakes for vehicles, and is particularly concerned with the provision of novel means for controlling the application of pressure to the hydraulically operated devices which are mechanically connected with the brake, bands, or brakes per se.

Generally speaking, a braking system embodying my invention comprises brake bands, or their equivalent, hydraulically operated devices which are mechanically connected with the brake bands, a manually or pedally operated fluid compressor, and fluid connections between the compressor and the hydraulically operated devices aforesaid. I have discovered that a system of this kind is greatly improved if it comprises means for preventing an excessively rapid increase in the pressure applied to the hydraulically operated devices associated with the brake bands after such hydraulically operated devices have been actuated to that extent necessary to take up the slack in the brake bands, and in the mechanical connection between such bands and the hydraulically operated actuating devices therefor.

One of the salient features of my present invention is a control valve of novel construction, which is interposed in the fluid pressure line between the compressor and the hydraulically operated devices which are associated with the several brake bands. This valve automatically functions to permit comparatively free communication between the compressor and the hydraulically operated devices until a definite predetermined pressure has been created in the pressure line. The valve, however, functions normally to restrict communication between the compressor and the hydraulically operated devices. The advantages which may be attributed to the control valve will more fully hereinafter appear.

Figure 1:
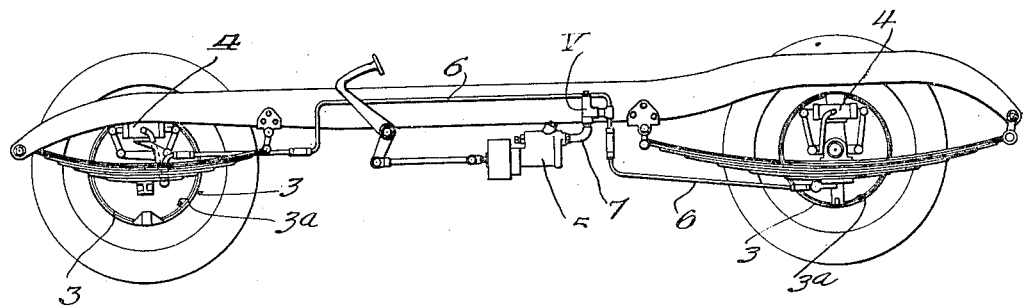
Figure 2:
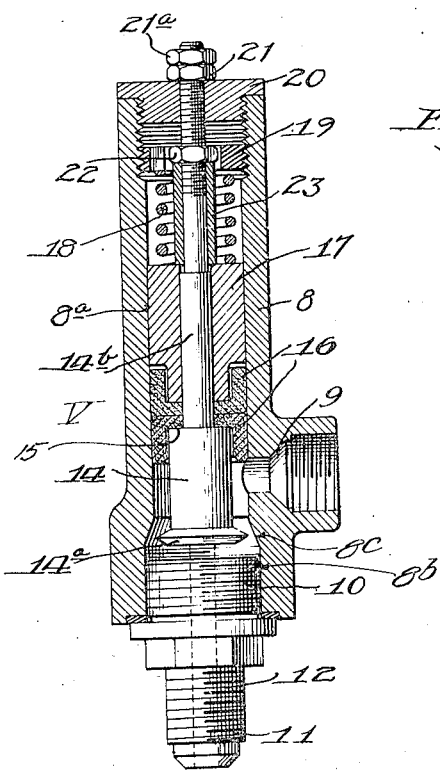

In the accompanying drawing illustrating my invention,

Figure 1 is a more or less diagrammatic view illustrating an automotive vehicle equipped with a braking system embodying my present invention, and Figure 2 is a vertical sectional view of the control valve.

Similar characters of reference refer to similar parts in the above figures.

In Figure 1 I have illustrated an automotive vehicle comprising a plurality of brake drums 3—3 (one front and one rear brake drum being illustrated) each brake drum being provided with a brake band 3ª. The brake bands are adapted to be drawn into braking relation with the brake drums upon the actuation of the hydraulically operated devices 4—4. The several devices 4 are connected with a pedally actuated fluid compressor 5 through conduits 6—6, the control valve V and the conduit 7 which is interposed between the compressor and the control valve.

It will be unnecessary in this specification to illustrate or describe the details of the compressor 5, or the details of the devices 4—4, nor will it be necessary or desirable to illustrate the manner of mounting the devices 4—4 in operating relation to the brake bands. The details of the compressor are illustrated in my co-pending application, Serial No. 531,144 filed January 23, 1922 and the structural details of the devices 4—4 and the conduits 6—6 are fully shown and described in my co-pending application, Serial No. 531,145 filed January 23, 1922. For the purpose of the present specification, it will suffice to state that actuation of the compressor 5 transmits fluid pressure to devices 4—4 through the pressure line comprising the conduit 7, the control valve and the several conduits 6—6.

Referring now to Figure 2, it will be noted that the control valve V comprises an open-ended housing 8, which is provided intermediate its ends with an outlet port 9. Threaded into one end of the housing is a plug 10 which is formed integral with a coupling nipple 11. A bore 12 extends through plug 10 and the nipple 11, as illustrated. Nipple 11 is adapted to be suitably connected with conduit 7, and outlet port 9 communicates with the conduits 6—6 which lead to the brake band operating devices 4—4.

I now call attention to the fact that housing 8 is provided with co-axial bores 8ᵃ and 8ᵇ, and with an intermediate conical or tapering bore 8ᶜ, which communicates with both the bores 8ᵃ and 8ᵇ. Mounted in the housing 8 is a plunger which comprises the head 14, the lower end of which is preferably beveled to a circular edge as indicated at 14ᵃ. The plunger is provided with a shoulder at 15, against which bears the lower of a pair of reversely disposed cup leathers 16—16, the cup leathers being arranged snugly to fit in bore 8ᵃ. Both cup leathers are disposed around the plunger stem 14ᵇ. Loosely disposed around the stem 14ᵇ is a block 17, the lower end of which is reduced to fit within the upper cup leather 16. A compression spring 18 acts between the upper end of the block 17 and the under surface of an externally threaded annulus 19, the annulus co-operating with internal screw threads at the upper end of the bore 8ᵃ. The normal compression of spring 18 is determined by the adjustment of the annulus 19. The upper end of the plunger stem extends freely through a central opening in the housing cap 20. Downward movement of the plunger is limited by engagement of the housing cap with the nut 21, and upward movement of the plunger is limited by engagement of the housing cap with the nut 22. Nut 21 may be provided with a lock nut 21ᵃ if desired. It should be noted that the sleeve 23 is disposed around the plunger stem, and is interposed between block 17 and nut 22. Tightening of the nut 22 thus serves firmly to clamp sleeve 23, block 17 and the cup leathers 16—16 upon the plunger proper.

In a valve of the dimensions illustrated in Figure 2, the area of the annular space between the circular edge 14ᵃ and the housing wall which lies therearound is equal to the cross-sectional area of a circular opening having a diameter of one-fourth inch, when the plunger is in its lower position. When the plunger is in its upper position, i. e., with the edge 14ᵃ lying within bore 8ᵃ, the area of the annular space between the edge 14ᵃ and the wall of bore 8ᵃ is approximately equal to .006 square inch in area.

It will be noted that the spring 18 normally holds the plunger in the position illustrated in Figure 2. Now let us assume the driver actuates compressor 5 to apply the brakes. Actuation of the compressor builds up fluid pressure in valve V and the several conduits leading to the brake band operating devices 4—4. As soon as the devices 4—4 have responded to a degree sufficient to take up the slack in the brake bands, the pressure on the several conduits interposed between devices 4—4 and the compressor rises very rapidly. A too rapid application of pressure to the braking devices 4—4 is apt to result in injury to the vehicle in general, and to the brake bands in particular. As soon as the pressure in the system has been raised to a predetermined degree, say, for instance, to a pressure of eighty pounds per square inch, the pressure of fluid against the several parts of the plunger structure overcomes the adjusted pressure of the spring 18, and the plunger moves upwardly to a position wherein the nut 22 lies against the cap 20. With the plunger in this, its upper, position, the circular edge 14ᵃ lies within bore 8ᵃ, hence with the plunger in its upper position communication between bore 12 and port 9 is restricted to a much greater extent than is the case when the plunger occupies its lower position. The restriction in the communication between the compressor and the devices 4—4 which is effected as soon as the pressure exceeds a predetermined figure adequately protects the car and brake bands from that injury which would result from an extremely rapid rise in the pressure applied to the devices 4—4.

When the pressure upon the compressor pedal is relieved, the pressure in the system drops a few pounds, and the plunger is forced down to its normal position by the spring 18, and thus the control valve in no way impedes quick releasal of the brakes.

Automobile drivers by reason of habit acquired through the use of ordinary foot brakes are inclined to give the compressor pedal a violent thrust when the brakes are to be applied. Such practice would be injurious to the car, and in some cases actually very dangerous, were it not for the presence of my control valve which, regardless of the speed at which the compressor pedal is operated, automatically prevents an excessively rapid rise in the fluid pressures applied to the brake band operating devices 4—4.

Having thus described my invention, what I claim is new, and desire to secure by Letters Patent of the United States is:

1. A braking apparatus comprising in combination, a fluid-pressure actuated brake operating device, a fluid compressor, a fluid pressure line extending between the compressor and the said brake operating device, and means interposed in said fluid pressure line and controlled by the pressure existing in said line arranged to partially close the communication between the compressor and the fluid-pressure actuated brake operating device when the fluid in said line has attained a predetermined pressure.

2. A braking apparatus comprising a fluid compressor, a fluid-actuated brake operating device, a line through which fluid is transmitted from said compressor to said brake operating device, and means, subject to the pressure developed by said compressor, arranged to partially close the communication between the compressor and the brake operating device aforesaid when the fluid in said line has attained a predetermined pressure.

3. A braking apparatus comprising in combination a fluid compressor, a fluid-pressure actuated brake operating device, a pressure line extending between said compressor and said brake operating device, a valve constituting a part of said pressure line, said valve comprising a fluid-actuated movable element which in one of its positions permits substantially unrestricted passage of fluid through the valve, and which when in another position partially closes the channel for the passage of fluid through the valve, and spring means normally holding said movable element in its first-mentioned position, said spring means yielding to permit the movable element to assume its restricted position when a predetermined fluid pressure is exerted on said movable element.

4. In a vehicle braking system, a plurality of brake bands, a fluid-actuated operating device associated with each brake band, a fluid compressor, a fluid pressure control valve, and a conduit affording communication between the compressor and the control valve, conduits affording communication between said control valve and said brake band operating devices, said control valve comprising fluid pressure actuated means which normally permits comparatively free communication between the compressor and brake operating devices, but functions to partially close such communication when a predetermined fluid pressure has been attained in said conduits.

5. In a braking system of the class described, a control valve comprising a housing having an opening therein provided with inlet and outlet ports, a movable restricting device disposed in said opening, said restricting device adapted, when subject to a predetermined fluid pressure, to assume a position wherein it partially closes communication between said inlet and outlet ports, and spring means adapted to hold said restricting device in a non-restricting position until the aforesaid predetermined pressure has been exerted on said restricting device.

In witness whereof, I hereunto subscribe my name this 9th day of January, 1922.

MALCOLM LOUGHEAD.

Witnesses:
 EMILE J. BOURGEOIS,
 DAGMAR PETERSON.